United States Patent [19]
Spichala

[11] 3,782,755
[45] Jan. 1, 1974

[54] HYDRAULIC LEVELLING APPARATUS FOR AUTOMOTIVE VEHICLES AND SHUT-OFF VALVE FOR THE SAME

[75] Inventor: Paul Spichala, Schweinfurt am Main, Germany

[73] Assignee: Fichtel & Sachs AG, Schweinfurt am Main, Germany

[22] Filed: Mar. 7, 1972

[21] Appl. No.: 232,570

[30] Foreign Application Priority Data
Mar. 20, 1971 Germany.................. P 21 13 596.6

[52] U.S. Cl.............................. 280/124 F, 280/6 R
[51] Int. Cl............................................. B60g 13/06
[58] Field of Search..................... 280/124 F, 124 R, 280/6 R, 6.1; 137/596, 596.11, 596.12

[56] References Cited
UNITED STATES PATENTS

| 2,475,298 | 7/1949 | Sloane | 137/596 |
| 3,492,013 | 1/1970 | Allen | 280/6 R |
| 3,032,350 | 5/1962 | Ruhl et al. | 280/124 F |

FOREIGN PATENTS OR APPLICATIONS

| 1,286,414 | 1/1969 | Germany | 280/124 |
| 1,159,282 | 12/1963 | Germany | 280/124 |
| 1,113,146 | 8/1961 | Germany | 280/124 |

Primary Examiner—Philip Goodman
Assistant Examiner—John A. Carroll
Attorney—Kurt Kelman et al.

[57] ABSTRACT

An automotive shut-off valve arranged between the control valve for hydraulic suspension elements of a vehicle and an engine-driven hydraulic pump prevents leakage of oil from the suspension elements to the sump when the engine is not operated although oil may leak through the valve controlling oil flow toward and away from the suspension elements in response to the relative vertical position of the sprung and unsprung vehicle masses, as is necessary for sensitive response of the control valve to changes in vehicle level. The shut-off valve has two spring-biased valve members of which one opens a passage between the hydraulic pump and the control valve when the pump is operated, and the other one is moved by a mechanical connection to an additional valve member to open a passage between the sump and the control valve. The additional valve member closes a throttled passage connecting the pump discharge to the sump and moves the other valve member against its biasing spring as the pressure of pumped liquid builds up in the shut-off valve, and the additional valve member is shifted back to its starting position by the other spring-biased valve member when the pump is shut down.

3 Claims, 6 Drawing Figures

HYDRAULIC LEVELLING APPARATUS FOR AUTOMOTIVE VEHICLES AND SHUT-OFF VALVE FOR THE SAME

This invention relates to levelling apparatus for automotive vehicles operated at least in part by means of hydraulic fluid, to a hydraulic system for such apparatus, and to a shut-off valve arrangement in the system.

It is known to provide automotive vehicles with hydraulic or hydropneumatic suspension elements and with a hydraulic system that supplies fluid to the suspension elements and drains fluid from the elements in response to changes in the vertical spacing of sprung and unsprung masses of the vehicle which affect the effective length of the suspension elements.

The direction of flow between a source of hydraulic fluid, such as a pressure pump and a sump or storage container for the hydraulic fluid and the suspension elements, is automatically controlled by a valve set by a sensing device responsive to the relative vertical position of the sprung and unsprung masses of the vehicle. In order not to affect the ride of the vehicle, the sensing device can provide only minimal forces for setting the control valve, and it is impractical to build a flow-reversing control valve capable of being operated by minimal forces, and yet tightly sealing the several associated conduits from each other.

If such conduits directly connect the control valve to the pump and to the sump, and if the pump is driven by the vehicle engine, as is customary, hydraulic fluid leaks from the suspension elements to the sump when the engine is stopped, and it is necessary to run the engine for a short time after starting to make up for the leakage loss and to restore the necessary effective length of the suspension elements. A similar problem arises when the unsprung masses are relieved of the weight of the sprung masses.

A primary object of the invention is the provision of a hydraulic system for levelling apparatus of the type described which maintains the effective length of the suspension elements during shut-down of the engine.

A more specific object is the provision of a shut-off valve suitable for being arranged between the hydraulic pressure pump and the control valve of the levelling arrangement which automatically prevents discharge of hydraulic fluid toward the sump from the suspension elements, such as hydraulic or hydropneumatic shock absorbers and springs when the pump pressure subsides.

The shut-off valve arrangement according to the invention has four ports which may connect the valve to respective conduits for flow of fluid between the valve and the conduits. They are a pressure port, a feed port, a return port, and a drain port. A first valve is operatively interposed between the pressure and drain ports and responds to flow of fluid from the pressure port toward the drain port by moving toward a closing position in which it seals the two ports from each other, and thereafter responds to higher pressure at the pressure port than at the drain port for maintaining its closing position.

A second valve is operatively interposed between the return port and the drain port and spring-biased toward a closing position in which it seals the return port from the drain port. A mechanical linkage connects the two valves in such a manner as to move either valve away from its closing position in response to movement of the other valve into the respective closing position. A third valve is interposed between the pressure and feed ports and is spring-biased toward a closing position in which it seals the feed and pressure ports from each other, but the biasing spring yields when the fluid pressure at the pressure port exceeds the fluid pressure at the feed port by a predetermined amount.

When this shut-off valve arrangement is assembled in a hydraulic system with a pressure pump and a container adapted to hold hydraulic fluid, a suction conduit connecting the pump intake with the container, a pressure conduit connecting the pressure discharge of the pump with the pressure port of the valve arrangement, and a drain conduit connecting the drain port to the container, the feed and return ports are automatically sealed from the pump and the container when the pump stops operating.

The hydraulic system may therefore be incorporated to advantage in a levelling apparatus for an automotive vehicle which has an engine for driving the aforementioned pump, a hydraulic suspension element interposed between the sprung and unsprung masses of the vehicle, resilient means biasing the suspension element in a direction to move the masses vertically away from each other, a feed conduit, a return conduit, and a control valve interposed between the suspension element and the feed and return conduits which connects the element to these conduits respectively in response to changes in the vertical spacing of the sprung and unsprung masses. The feed conduit is connected to the feed port in the shut-off valve arrangement of the hydraulic system, and the return conduit to the return port. In the assembled apparatus, a body of hydraulic fluid substantially fills the suspension element, the feed conduit, the return conduit, and the control valve under all operative conditions.

Other features, additional objects, and many of the attendant advantages of this invention will readily be appreciated as the same becomes better understood by reference to the following detailed description of a preferred embodiment when considered in connection with the appended drawing in which:

FIG. 1 diagrammatically illustrates a levelling arrangement for an automotive vehicle;

Figure 1:
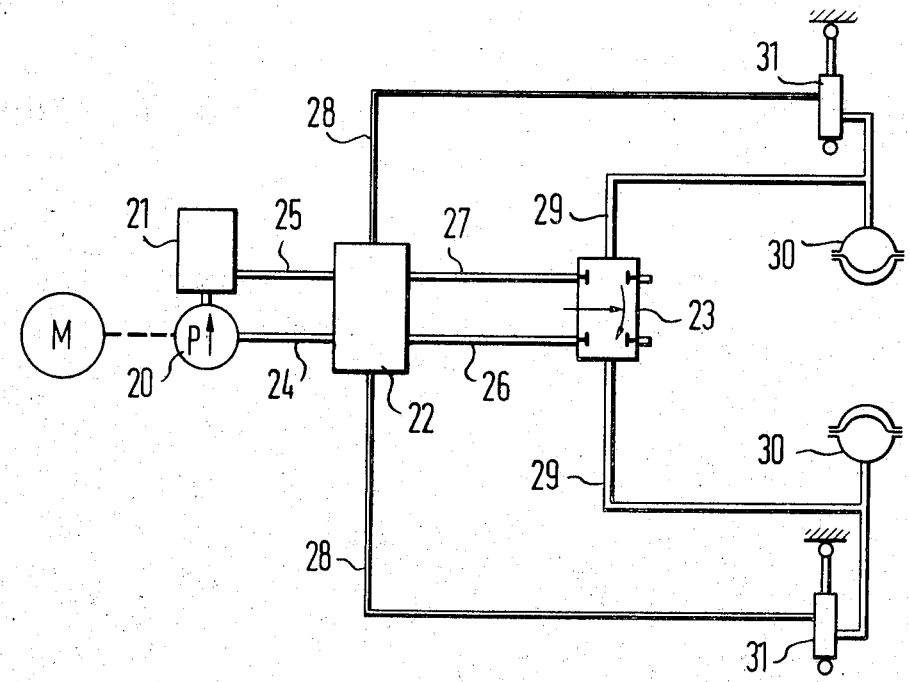

Referring now to the drawing in detail, and initially to FIG. 1, there is shown a hydraulic pressure pump 20 which is driven by the vehicle engine M whenever the engine operates. The pump 20 draws hydraulic fluid, hereinafter referred to as "oil" for the sake of bravity, through a suction conduit and its intake from a storage container or sump 21, and discharges it under pressure toward a shut-off valve 22 and a level control valve 23 through a pressure line 24 connecting the pump to the shut-off valve. When the shut-off valve does not forward the oil to the control valve 23, it returns the oil to the sump 21 through a drain line 25. Oil flows between the valves 22, 23 through a feed line 26 and a return line 27. Two connecting lines 29 communicate each with a pneuamtic spring 30 and a shock absorber 31. Oil leaking from each shock absorber 31 is directed to the shut-off valve 22 through a hose 28.

Figure 6:
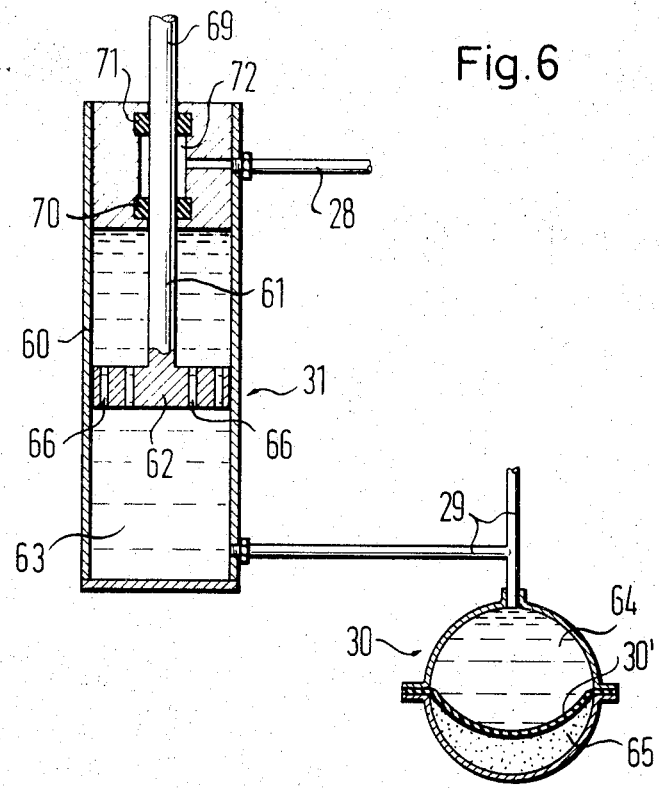
FIG. 6 shows a shock absorber and an associated pneumatic spring of the arrangement of FIG. 1 in section.

One of the two identical shock absorbers 31 and its associated pneumatic spring 30 are seen in more detail in FIG. 6. The spring 30 is a container divided into two chambers 64, 65 by a flexible diaphragm 30'. The chamber 64 is filled with oil and communicates with the connecting line 29, and the chamber 65 is sealed and filled with compressed air or nitrogen.

The shock absorber 31 has a cylinder 60 and a coaxial piston rod 61 respectively fastened to the sprung and unsprung masses of the vehicle in a conventional manner, not illustrated. The inner end of the piston rod 61 is fastened to a piston 62, and the compartment 63 of the cylinder cavity remote from the piston rod 61 communicates directly with the connecting line 29. The compartment 63 is connected with the annular cylinder compartment about the piston rod 61 through axial throttling passages 66 in the piston 62.

The annular cylinder cover 69 is sealed to the piston rod 61 by two axially spaced sealing rings 70, 71 which axially bound an annular chamber 72 radially separating the piston rod 61 from the cover 59. The chamber 72 communicates with the hose 28.

Figure 5:
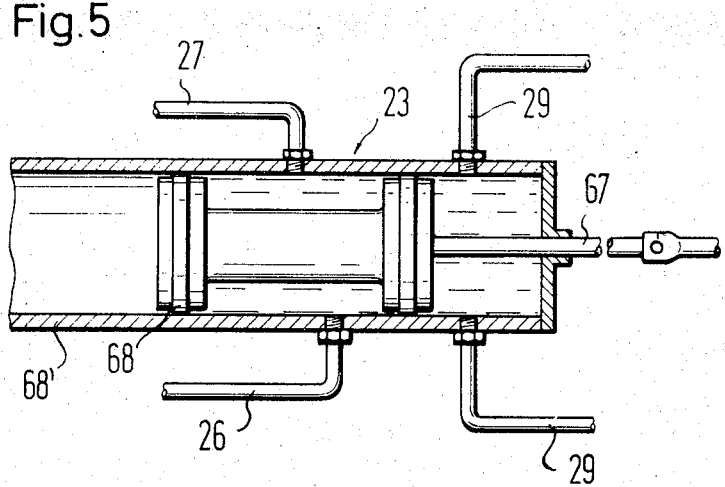
FIG. 5 shows the level control valve of the arrangement of FIG. 1 in elevational section.

FIG. 5 shows the level control valve 23 which directs the flow of oil between the two shock absorbers 31 and the shut-off valve 22. The valve 23 has a slide 68 axially movable in a tubular housing 68'. The two connecting lines 29 enter the valve housing 68' on a common axial level spaced from the orifice of the return line 27. The orifice of the feed line 26 is axially intermediate the orifices of the lines 27 and 29. The valve slide 28 is moved axially in the sleeve or housing 68' by a linkage 67 connected to a device which senses the distance between the sprung and unsprung masses of the vehicle and shifts the valve slide 68 in a direction to restore a normal distance, as is conventional in itself and not shown in detail.

In the illustrated position of the control valve 23, oil is sealed in the shock absorbers 31 except for minor leakage past the slide 68, which must move freely in the housing 68', and oil reaching the valve housing 68' from the valve 23 through the feed line 26 is directly returned to the valve 22 through the return line 27. When the distance between the sprung and unsprung masses becomes too small, the valve slide 68 is shifted toward the right, as viewed in FIG. 5, until it seals the orifice of the return line 27 and connects the feed line 26 to the connecting lines 29 and the shock absorbers 31 to expand the latter. When the distance is excessive, the slide 68 moves far toward the left, until all lines 26, 27, 29 communicate with each other, and oil from the shock absorbers 31 can flow out through the return line 27 together with the oil supplied by the feed line 26.

Figure 2:
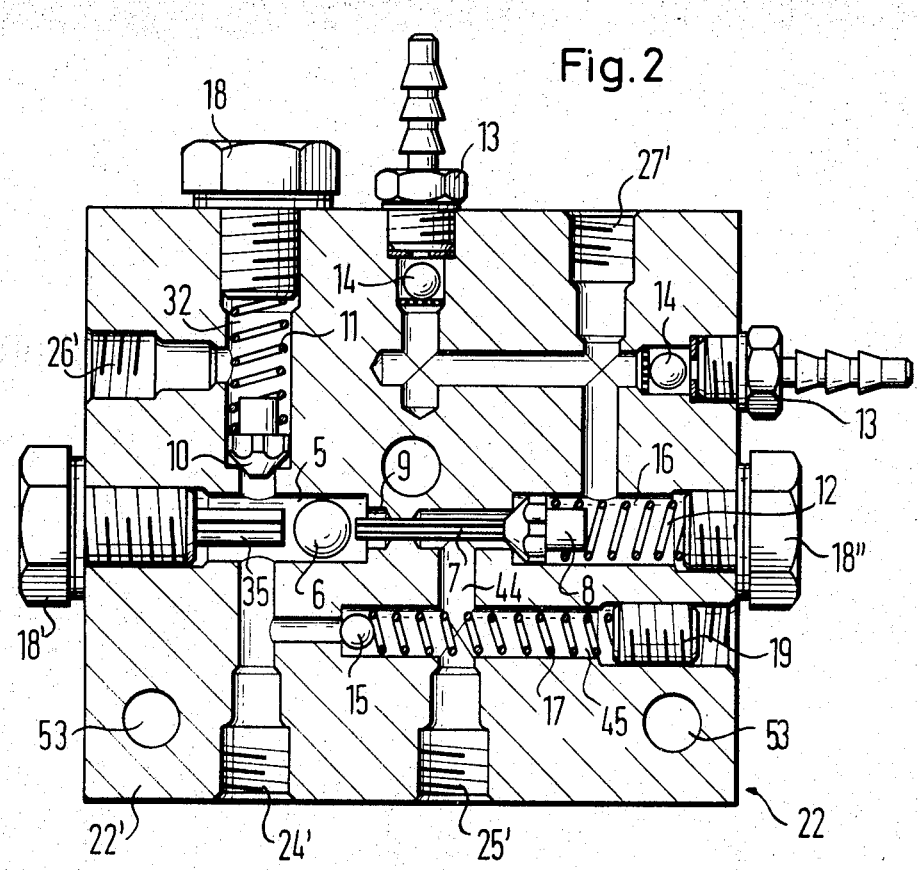
FIG. 2 shows a shut-off valve in the arrangement of FIG. 1 in elevational section.
Figure 3:
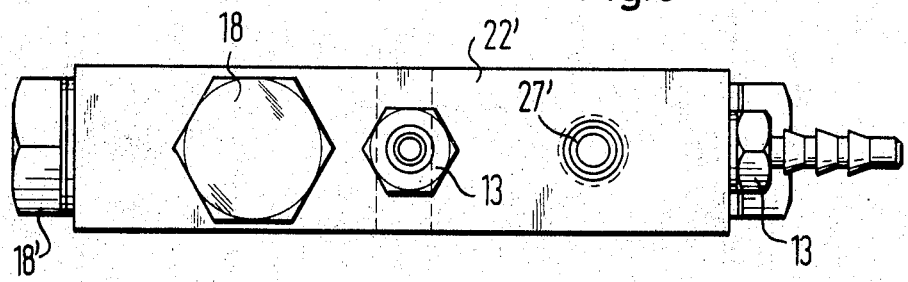
FIG. 3 illustrates the valve of FIG. 2 in plan view.

At the core of this invention is the shut-off valve 22 whose body has the shape of a square metal plate 22', as is evident from joint consideration of FIGS. 2 and 3, and which is formed with variously connected straight bores in a common median plane parallel to the square faces and having respective orifices in the narrow edge faces.

A first bore 32 vertically passing through the valve plate 22' begins at a threaded port 24' in the bottom face which normally receives the pressure line 24 coming from the pump 20. The analogous port of the bore 32 in the top face of the valve plate is sealed by a threaded plug 18. The bore 32 is of stepped cylindrical shape, and its cross section decreases from both ports inward of the valve plate 22'. The plug 18 provides an abutment for a helical compression spring 11 which biases a conical valve member 10 toward a seat on a shoulder in the first bore 32. The portion of the first bore which receives the spring 11 communicates with a threaded feed port 26' in the left side face of the valve plate 22', as viewed in FIG. 2. The feed line 26 is connected to the port 26' in the assembled condition of the valve 22.

The two ends of a second, horizontal through-bore 9 of stepped, cylindrical configuration are sealed by respective threaded plugs 18', 18''. The wide portion 5 of the second bore 9 adjacent the plug 18' intersects the first bore 32 between the valve 10 and the port 24'. A spherical valve member 6 is received with clearance in the wide bore portion 5 and prevented from blocking the intersection of the first and second bores by a narrow abutment pin 35 on the plug 18'. In the condition of the valve 22 seen in FIG. 2, the valve member 6 is held off its seat at the inner end of the wide bore portion 5 by a slotted pin 7 guided in the narrowest portion of the horizontal second bore 9 and fixedly fastened to a conical valve member 8, which is shown in FIG. 2, to seal a wide bore portion 16 adjacent the plug 18'' under the pressure of a helical compression spring 12 interposed between the plug 18'' and the valve member 8.

An end of the drain line 25 is normally inserted in a threaded drain port 25' in the narrow bottom face of the valve plate 22' and communicates with the horizontal second bore 9 in the portion of the latter between the seats of the valve members 6 and 8 through a vertical bore 44 so that liquid may flow between the pressure port 24' and the drain port 25' through the slot in the pin 7.

Another horizontal bore 45 extends from an orifice in the right side wall of the valve plate, closed by a threaded plug 19, to the first, vertical bore 32 intermediate the pressure port 24' and the wide portion 5 of the second, horizontal bore, and is normally closed by a spherical pressure-relief valve 15 under the force of a helical compression spring 17. The bore 45 intersects the bore 44, thereby permitting oil flow between the ports 24' and 25' when the pressure in the port 24 becomes excessive and opens the valve 15.

A return port 27' for the return line 27 in the top face of the valve plate 22' is connected with the wide portion 16 of the second, horizontal bore 9 and with two nipples 13 on the top face and right side face respectively of the valve plate. The nipples 13 are equipped with check valves 14 preventing outward flow of oil from the valve 22 through the nipples 13 which normally attach the hoses 28 to the shut-off valve 22.

Mounting holes 53 connect the square faces of the valve plate 22' and normally receive bolts which attach the valve 22 to the vehicle.

The apparatus described above operates as follows:

When the engine is started while the shut-off valve 22 is in the condition seen in FIG. 2, in which the valve 6 is open and the valves 8 and 10 are closed, oil initially can flow through the narrow slot in the pin 7 from the pressure port 24' to the drain port 25'. Because of the throttling effect of the slot and of the valve member 6, the pressure rises in the wide portion 5 of the bore 9, and the valve member 6 ultimately engages its seat and shifts the pin 7 together with the conical valve member 8 toward the right, thereby interrupting direct communication between the ports 24', 25' and opening a flow path between the return port 27' and the drain port 25'.

Figure 4:
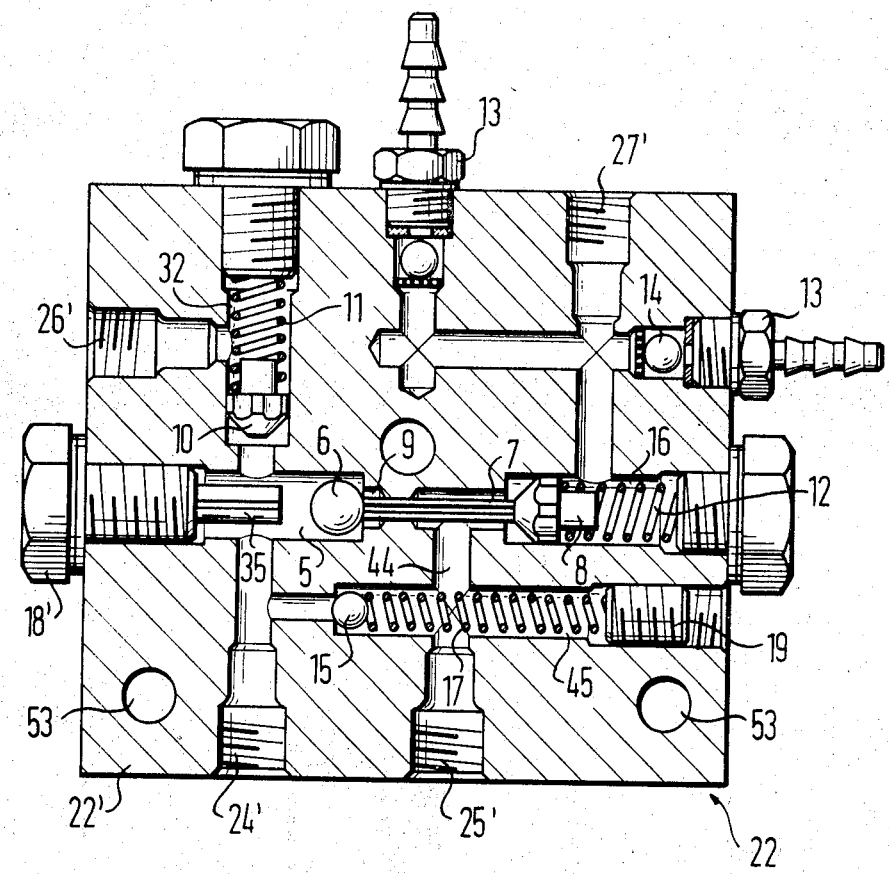
FIG. 4 shows the valve of FIG. 2 in a different operating position.

As the oil pressure further rises in the bore portion 5, it can ultimately overcome the restraining force of the valve spring 11 and lift the conical valve member 10 from its seat to permit oil flow from the pressure port 24' to the feed port 26'. Oil now flows from the pump through the lines 24, 26 to the control valve 23, and can return to the sump 21 through the lines 27, 25. Friction in the lines maintains a pressure differential sufficient to keep the valve member 6 seated and the valve member 8 in the open position against the force of the spring 12. This condition of the valve 22 is shown in FIG. 4.

If the control valve 23 is in the position shown in FIG. 5 corresponding to a normal distance between the sprung masses (body or frame) of the vehicle and the unsprung masses (axle and wheels) in which the pneumatic springs 30 are adequately effective, the oil moves from the feed line 26 directly to the return line 27 through the valve body 68'.

If the distance is too small, as under an increased static of dynamic load, the oil flowing under pressure through the feed line 26 is supplied by the valve 23 to the shock absorbers 31 for expanding the same until the normal spacing of body and axle is restored, and the valve slide 68 is returned to the illustrated position. If the distance is excessive, oil is returned from the shock absorbers 31 to the sump 21 as described above to shorten the effective length of the shock absorbers. No changes occur in the shut-off valve 22 during the three basic modes of operation of the control valve 23.

When the engine M and the pump 20 are stopped, the pressure at the port 24' drops and cannot keep the valve 10 in the open position against its spring 11. As the pressure in the wide bore portion 5 decays, the spring 12 can return the valve members 8 and 6 to the respective positions seen in FIG. 2.

Because of the required free movement of the valve slide 68 in the housing 68' of the control valve 23, oil now tends to flow from the pneumatic springs 30 and the shock absorbers 31 toward the valve 22 through the lines 26, 27 as the oil leaks past the valve slide 68 under the pressure supplied by the gas cushions in the chambers 65 and the weight of the vehicle body. In the absence of the shut-off valve 22, oil would be discharged slowly from the springs 30 and shock absorbers 31 into the sump 21. However, all communication between the shock absorbers 31 and the sump 21 is interrupted by the seated valve members 8, 10, and the higher fluid pressure in the shock absorbers and communicating elements helps to keep the valve members 8, 10 in sealing engagement with their seats.

During normal operation, the nipples 13 are connected to the drain port 25' by the open check valves 14, and oil leaking past the sealing rings 70 into the chambers 72 during oscillation of the pistons 62 is discharged to the sump 21 through the hoses 28. When the engine is shut off, and the pressure rises in the bore portion 16 behind the valve 8, the check valves 14 are closed, and oil under pressure cannot flow into the chambers 72. Significant amounts of oil do not leak through the ring 70 when the piston rod 61 stands still, and such minute amounts of oil that may still enter the chamber 72 from the cylinder 60 are retained by the sealing ring 71.

The shut-off valve 22 thus maintains the normal operating level of the sprung vehicle masses when the engine is shut off. It is also effective when the vehicle is raised by a service station lift which acts on the frame or body directly, so that the axles and wheels depend freely from the frame, and the control valve slide 68 is shifted toward the left from the position seen in FIG. 5. In the absence of the valve 22, the compressed gas in the pneumatic springs 30 would drive the oil from the springs into the sump 21 so that the vehicle, when lowered to its wheels by the lift, would come to rest on much shortened shock absorbers 31. When the engine is then started, and the vehicle is driven from the lift, its bottom may hit a low projection on the ground before the shock absorbers can be restored to their normal length. Partial emptying of the shock absorbers 31 in the raised vehicle, however, is impossible with the valve 22 in which the connection between the lines 26, 27 and the sump 21 is interrupted shortly after the engine is shut off.

The pressure relief valve 15 prevents damage to the apparatus by oil under excessive pressure in the event of malfunctioning, as is conventional in itself.

While the shut-off valve 22 has been described in its application to a levelling arrangement for an automotive vehicle, other uses in hydraulic equipment will readily suggest themselves. The use of the valve in a hydraulic press is specifically contemplated and has obvious advantages.

It should be understood, therefore, that the foregoing disclosure relates only to a preferred embodiment, and that it is intended to cover all changes and modifications of the example of the invention herein chosen for the purpose of the disclosure which do not constitute departures from the spirit and scope of the invention set forth in the appended claims.

The basic principle of this invention can with respect to FIGS. 1 and 2 be regarded as follows:

Lines 24 and 26 together are a feed conduit; lines 27 and 25 together are a return conduit. In return conduit 27, 25 is provided a shut-off valve 8. This shut-off valve 8 is controlled by a valve member 6 via slotted pin 7 so that shut-off valve 8 is open when a certain pressure is exceeded at the pressure discharge of the pump 21 and is closed when the pressure at said pressure discharge is below said predetermined value. The valve member 6 can therefore be regarded as pressure-sensitive control means for the shut-off valve 8.

What is claimed is:

1. In a levelling apparatus for an automotive vehicle having an engine, a hydraulic suspension element interposed between the sprung and the unsprung masses of the vehicle, resilient means biasing said element in a direction to move said masses vertically away from each other, a feed conduit, a return conduit, and control valve means interposed between said element and said feed and return conduits for connecting said element to said feed and return conduits respectively in response to changes in the vertical spacing of said masses, the improvement which comprises:

a. a shut-off valve arrangement including 1. a plurality of port means for connecting the valve arrangement to respective conduits for flow of fluid between the valve arrangement and said conduits, said port means including pressure port means, feed port means, return port means, and drain port means, 2. first valve means operatively interposed between said pressure port means and said drain port means and responsive to a flow of fluid from said pressure port means toward said drain port means for moving toward a closing position in which said first valve means seals said pressure port means from said drain port means, and thereafter responsive to higher pressure at said pressure port means than at said drain port means for maintaining the closing position thereof, 3. second valve means operatively interposed between said return port means and said drain port means, 4. yieldably resilient means biasing said second valve means toward a closing position in which said second valve means seals said return port means from said drain port means, 5. motion transmitting means interposed between said first and second valve means for moving each of said valve means away from the closing position thereof in response to movement of the other valve means into the respective closing position, 6. third valve means interposed between said pressure port means and said feed port means; and 7. yieldably resilient means biasing said third valve means toward a closing position in which said third valve means seals said feed port means from said pressure port means, but adapted to yield when the fluid pressure at said pressure port means exceeds the fluid pressure at said feed port means by a predetermined amount;

b. a pressure pump having an intake and a pressure discharge;

c. a container adapted to hold hydraulic fluid;

d. a suction conduit connecting said intake to said container;

e. a pressure conduit connecting said pressure discharge to said pressure port means;

f. a drain conduit connecting said drain port means to said container,
   1. said engine being drivingly connected to said pump,
   2. said feed conduit being connected to said feed port means, and
   3. said return conduit being connected to said return port means; and g. a body of hydraulic fluid substantially filling said element, said feed conduit, said return conduit, and said control valve means.

2. In an apparatus as set forth in claim 1, wherein said element has two members movable relative to each other and jointly bounding a cavity substantially filled with fluid of said body, the improvement further comprising a chamber bounded by one of said members and located for collecting fluid leaking from said cavity, a leakage conduit communicating with said chamber, and a check valve operatively interposed between said leakage conduit and said return port means for connecting the leakage conduit to said return port means only when the fluid pressure in the return port means is not greater than in said leakage conduit.

3. In an apparatus as set forth in claim 1, pressure relief valve means interposed between said pressure port means and said drain port means for directly connecting said last-mentioned port means, and yieldably resilient means holding said relief valve means in a closed position and thereby preventing a direct connection between said last-mentioned port means unless the fluid pressure at said pressure port means exceeds the pressure at said drain port means by a predetermined amount.

\* \* \* \* \*